(12) United States Patent  
Yamasaki et al.

(10) Patent No.: US 12,352,779 B2
(45) Date of Patent: Jul. 8, 2025

(54) SCANNING PROBE MICROSCOPE AND METHOD FOR MEASURING PHYSICAL QUANTITY USING SCANNING PROBE MICROSCOPE

(71) Applicant: Shimadzu Corporation, Kyoto (JP)

(72) Inventors: Kenji Yamasaki, Kyoto (JP); Akinori Kogure, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 1065 days.

(21) Appl. No.: 17/266,648

(22) PCT Filed: Aug. 9, 2018

(86) PCT No.: PCT/JP2018/029917
§ 371 (c)(1),
(2) Date: Feb. 8, 2021

(87) PCT Pub. No.: WO2020/031329
PCT Pub. Date: Feb. 13, 2020

(65) Prior Publication Data
US 2021/0316986 A1 Oct. 14, 2021

(51) Int. Cl.
*G01Q 20/02* (2010.01)
*B82Y 35/00* (2011.01)
(Continued)

(52) U.S. Cl.
CPC .............. *G01Q 20/02* (2013.01); *B82Y 35/00* (2013.01); *G01Q 60/32* (2013.01); *G01Q 60/38* (2013.01)

(58) Field of Classification Search
None
See application file for complete search history.

(56) References Cited

U.S. PATENT DOCUMENTS

2011/0015380 A1 * 1/2011 Vezenov ............. C12Q 1/6816
977/774

FOREIGN PATENT DOCUMENTS

EP 3290929 A1 * 3/2018 ......... G01N 23/2251
JP 6-307850 A 11/1994
(Continued)

OTHER PUBLICATIONS

Written Opinion by the International Search Authority for PCT application No. PCT/JP2018/029917, dated Nov. 6, 2018, submitted with a machine translation.

*Primary Examiner* — Andrew Smyth
(74) *Attorney, Agent, or Firm* — Muir Patent Law, PLLC

(57) ABSTRACT

A scanning probe microscope (50) is provided with a probe (20), a cantilever (2) supporting the probe (20), a scanner (43) on which a sample (S) is placed, a drive unit (4) for changing the distance between the sample (S) and the probe (20), and a displacement measurement unit (3) for measuring the displacement of the cantilever (2). The scanning probe microscope (50) is provided with a curve generation unit (11) for generating a first curve representing the relation between the distance between the probe (20) and the sample (S) and the quantity representing the displacement of the cantilever (2) when the sample (S) approaches the probe (20) and a second curve representing the relation between the distance between the probe (20) and the sample (S) when the sample (S) moves away from the probe (20) and the quantity representing the displacement of the cantilever (2), and a physical quantity calculation unit (53) for determining the quantity representing the area between the first curve and the second curve as a physical quantity of the sample.

16 Claims, 12 Drawing Sheets

(51) Int. Cl.
*G01Q 60/32* (2010.01)
*G01Q 60/38* (2010.01)

(56) References Cited

FOREIGN PATENT DOCUMENTS

| | | | |
|---|---|---|---|
| JP | 2000-346782 A | | 12/2000 |
| JP | 2007047070 A | * | 2/2007 |
| WO | 2018/044164 A1 | | 3/2018 |
| WO | WO-2018044164 A2 | * | 3/2018 ......... G01N 23/2251 |
| WO | WO-2018044164 A3 | * | 4/2018 ......... G01N 23/2251 |

* cited by examiner

SCANNING PROBE MICROSCOPE AND METHOD FOR MEASURING PHYSICAL QUANTITY USING SCANNING PROBE MICROSCOPE

TECHNICAL FIELD

The present invention relates to a scanning probe microscope and a method for measuring a physical quantity using the scanning probe microscope.

BACKGROUND ART

Conventionally, a method for observing characteristics of a sample using a scanning probe microscope is known (see, e.g., Patent Document 1). In a scanning probe microscope, by measuring a force curve representing the distance-dependence of forces acting on the probe and the sample surface, physical properties, such as, e.g., a shape, an attraction force, an adsorption force, and a hardness of a sample, can be measured. In addition, by measuring physical properties while moving the probe in the X-Y direction and imaging, it is possible to observe and analyze the surface state of the sample. A user can obtain the knowledge about a sample, such as, e.g., roughness and physical properties, from the analysis image.

PRIOR ART DOCUMENT

Patent Document

Patent Document 1: Japanese Unexamined Patent Application Publication No. 2000-346782

SUMMARY OF THE INVENTION

Problems to be Solved by the Invention

However, depending on the measured sample, the distance-dependence of the forces acting on the probe and the sample surface changes. For example, in a case where a sample is soft, the adsorbed quantity cannot be measured from the force curve.

It is therefore an object of the present invention to provide a scanning probe microscope and a method for measuring a physical quantity using a scanning probe microscope, capable of measuring physical quantities representing the physical properties of a sample, regardless of the hardness of the sample.

Means for Solving the Problem

A scanning probe microscope according to the preset invention includes:
a probe;
a support member supporting the probe;
a placement unit configured to place a sample thereon;
a drive unit configured to change a distance between the sample and the probe;
a displacement measurement unit configured to measure a displacement of the support member;
a curve generation unit configured to generate a first curve representing a relation between the distance between the probe and the sample and a quantity representing the displacement of the support member when the sample approaches the probe and a second curve representing a relation between the distance between the probe and the sample and a quantity representing the displacement of the support member when the sample moves away from the probe; and
a physical quantity calculation unit configured to calculate, as a physical quantity of the sample, a quantity representing an area between the first curve and the second curve.

Preferably, the physical quantity of the sample is a quantity representing hardness of the sample.

Preferably, the curve generation unit uses a force that the support member receives due to the displacement as a quantity representing the displacement of the support member.

Preferably, the drive unit scans the sample or the probe in a horizontal direction. The displacement measurement unit measures the displacement of the support member at each position in the horizontal direction. The curve generation unit generates the first curve and the second curve at each position in the horizontal direction. The physical quantity calculation unit calculates the physical quantity at each position in the horizontal direction. The scanning probe microscope further includes an image generation unit configured to generate an image in which the physical quantity with respect to each position in the horizontal direction is represented by a pixel value.

Preferably, the physical quantity calculation unit calculates, as the physical quantity of the sample, a quantity representing the area between the first curve and the second curve in a range of a distance between the support member and the sample in which a magnitude of an inclination of the first curve is equal to or greater than a threshold.

Preferably, the physical quantity calculation unit calculates, as the physical quantity of the sample, a quantity representing the area between the first curve and the second curve in a range of a distance between the support member and the sample in which a magnitude of an inclination of the second curve is equal to or greater than a threshold.

Preferably, the physical quantity calculation unit calculates, as the physical quantity of the sample, a quantity representing the area between the first curve and the second curve in a range of a distance between the support member and the sample in which a magnitude of an inclination of the first curve is equal to or greater than a first threshold and a magnitude of an inclination of the second curve is equal to or greater than a second threshold.

Preferably, the physical quantity calculation unit calculates, as the physical quantity of the sample, a quantity representing an area between the first curve and the second curve in a range in which a distance between the support member and the sample is specified.

Preferably, the physical quantity calculation unit calculates the physical quantity for each of a plurality of the specified ranges. The image generation unit generates a plurality of images different in the specified range.

Preferably, the displacement measurement unit measures the displacement at a plurality of points of the distance between the probe and the sample. The physical quantity calculation unit calculates a difference value between a quantity representing a displacement on the first curve and a quantity representing a displacement on the second curve at each of the plurality of points and calculates a sum of the difference values as the physical quantity of the sample.

A scanning probe microscope according to the present invention, includes:
a probe;
a support member supporting the probe;
a placement unit configured to place a sample thereon;

a drive unit configured to change a distance between the sample and the probe;

a displacement measurement unit configured to measure a displacement of the support member;

a curve generation unit configured to generate a first curve representing a relation between the distance between the probe and the sample and a quantity representing a displacement of the support member when the sample approaches the probe and a second curve representing a relation between the distance between the probe and the sample and a quantity representing the displacement of the support member when the sample moves away from the probe; and a shape value calculation unit configured to calculate, as a shape value representing a surface shape of the sample, a distance between the support member and the sample corresponding to a quantity representing a specified displacement on the first curve or the second curve.

The drive unit scans the sample or the probe in a horizontal direction,

The displacement measurement unit measures the displacement of the support member at each position in the horizontal direction.

The curve generation unit generates the first curve and the second curve at each position in the horizontal direction.

The shape value calculation unit calculates the shape value at each position in the horizontal direction.

The scanning probe microscope further includes an image generation unit configured to generate an image in which the shape value with respect to each position in the horizontal direction is represented by a pixel value.

The shape value calculation unit calculates the shape value with respect to each of a plurality of the specified displacements.

The image generation unit generates the plurality of images different in the specified displacement.

Preferably, the support member is a cantilever.

The present invention relates to a method of measuring a physical quantity using a scanning probe microscope comprising a probe, a support member supporting the probe, and a placement unit configured to place a sample thereon, a drive unit, and a displacement measurement unit. The method for measuring a physical quantity using a scanning probe includes:

a step of changing a distance between the sample and the probe by the drive unit;

a step of measuring a displacement of the support member by the displacement measurement unit;

a step of generating a first curve representing a relation between the distance between the probe and the sample and a quantity representing a displacement of the support member when the sample approaches the probe and a second curve representing a relation between the distance between the probe and the sample and a quantity representing the displacement of the support member when the sample moves away from the probe; and a step of calculating a quantity representing an area between the first curve and the second curve as a physical quantity of the sample.

Effects of the Invention

According to the present invention, it is possible to measure a physical quantity representing physical properties of a sample regardless of the hardness of the sample.

EMBODIMENTS FOR CARRYING OUT THE INVENTION

Hereinafter, some embodiments of the present invention will be described with reference to the attached drawings.

First Embodiment

Figure 1:
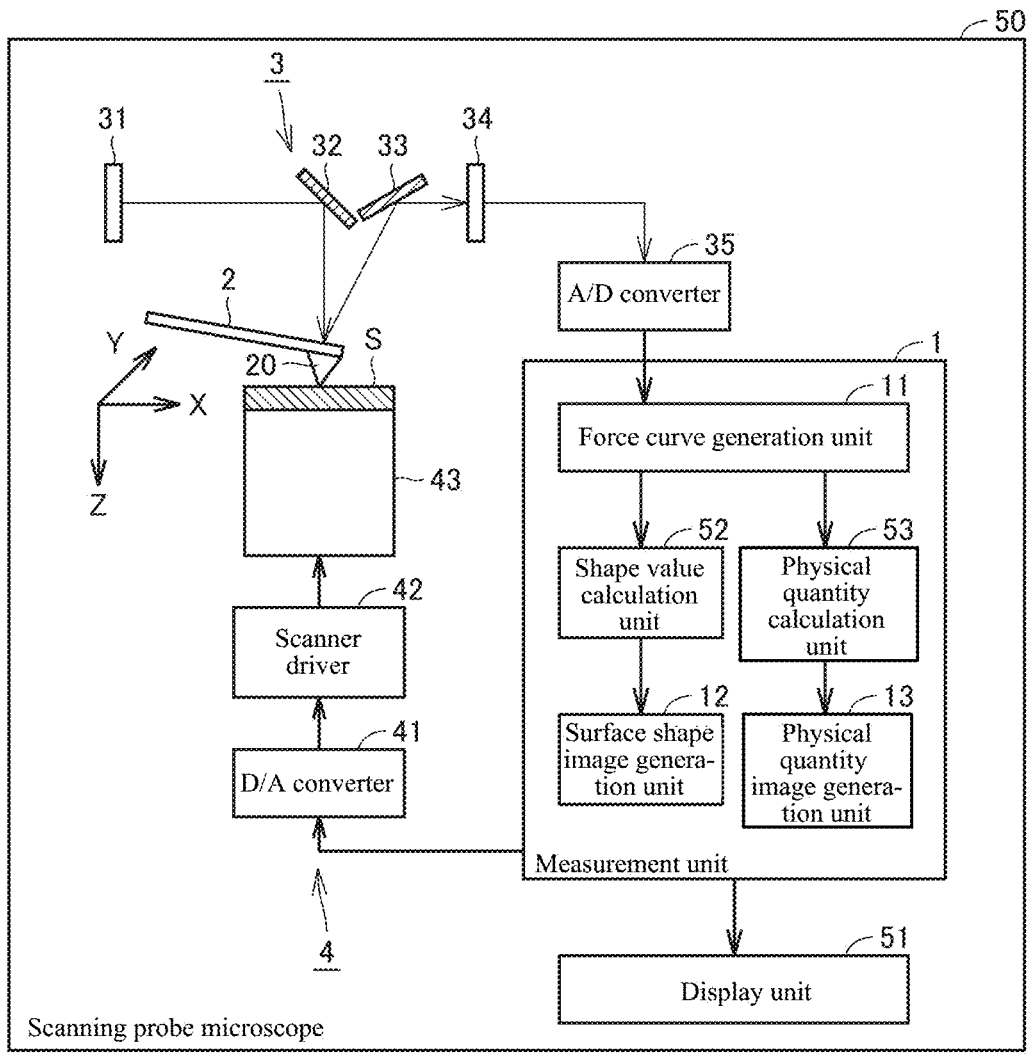
FIG. 1 is a diagram showing a configuration of a scanning probe microscope 50 according to a first embodiment.

FIG. 1 is a diagram showing a configuration of a scanning probe microscope 50 according to a first embodiment.

As shown in FIG. 1, the scanning probe microscope 50 is provided with a scanner 43, a probe 20, a cantilever 2, a displacement measurement unit 3, an A/D converter 35, a measurement unit 1, a drive unit 4, and a display unit 51.

The scanner 43 is configured to place a sample S thereon and is driven three-dimensionally by the drive unit 4.

The cantilever 2 supports the probe 20. The atomic force (attraction force or repulsive force) between the probe 20 and the sample S causes the displacement of the cantilever 2.

The displacement measurement unit 3 detects the deflection of the cantilever 2. The displacement measurement unit 3 is provided with a light source 31, mirrors 32 and 33, and a photodetector 34. The light source 31 is configured by a laser oscillator or the like that emits laser light. The mirrors 32 and 33 constitute an optical system. The photodetector 34 is constituted by a photodiode or the like for detecting laser light to be incident. The laser light emitted from the light source 31 is reflected by the mirror 32 and is incident on the cantilever 2. The laser light is reflected by the cantilever 2, further reflected by the mirror 33, and incident on the photodetector 34. The displacement of the cantilever 2 can be measured by the photodetector 34 detecting the laser light.

The A/D converter 35 converts the displacement signal detected by the photodetector 34 into a digital signal.

The measurement unit 1 is provided with a force curve generation unit 11, a shape value calculation unit 52, a surface shape image generation unit 12, a physical quantity calculation unit 53, and a physical quantity image generation unit 13.

The force curve generation unit 11 generates a force curve representing the time change of the acting force from the time change of the displacement of the cantilever 2.

Specifically, the force curve generation unit 11 calculates the force [N] by multiplying the spring constant K [N/m] and the sensitivity S [m/V] by the displacement D [V] of the cantilever 2. The spring constant K is the spring constant of the spring connected to the probe 20. The sensitivity is the inverse of the inclination of the force curve when the force curve is made with a hard sample causing no deformation.

The shape value calculation unit 52 calculates the shape value of the sample S from the force curve.

The surface shape image generation unit 12 generates a surface shape image in which the shape value at each location obtained by scanning the sample S in the XY-plane (in the horizontal direction) by the scanner 43 is represented by a pixel value.

The physical quantity calculation unit 53 calculates an elastic recovery quantity as the physical quantity of the sample S from the force curve. The elastic recovery quantity is a quantity that represents how quickly the depression of the sample S returns when the probe 20 is pushed into the sample S to depress the sample S and then the probe 20 is moved away from the sample S. The softer the sample S, the greater the elastic recovery quantity. Therefore, the elastic recovery quantity is also a quantity representing the hardness of the sample S.

The physical quantity image generation unit 13 generates an elastic recovery image in which the elastic recovery quantity at each location obtained by scanning the sample S in the XY-plane (in the horizontal direction) by the scanner 43 is represented by a pixel value.

The measurement unit 1 outputs a control signal to the drive unit 4.

The drive unit 4 is provided with a D/A converter 41 and a scanner driver 42. The D/A converter 41 converts the digital control signal from the measurement unit 1 into an analog signal and sends it to the scanner driver 42.

The scanner driver 42 may scan the sample S by driving the scanner 43 in the X-axis direction, in the Y-axis direction, and in the Z-axis direction upon receipt of the control signal. In FIG. 1, the Z-axis direction is a vertical direction, and the X-Y plane is a horizontal plane. To generate an image, the drive unit 4 moves the sample S in the X-direction and the Y-direction, respectively, by several tens of μm to several tens of nm.

Figure 2:
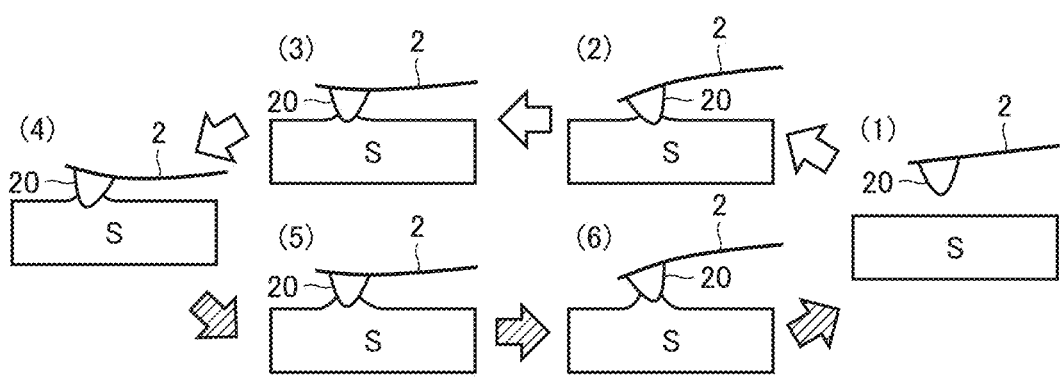
FIG. 2 is a diagram showing a displacement of a cantilever 2 when a sample S approaches the cantilever 2 in the vertical direction and a displacement of the cantilever 2 when the sample S moves away from the cantilever 2 in the vertical direction.

FIG. 2 is a diagram showing the displacements of the cantilever 2 when the sample S approaches the probe 20 in the vertical direction and when the sample S is released from the probe 20 in the vertical direction.

Figure 3:
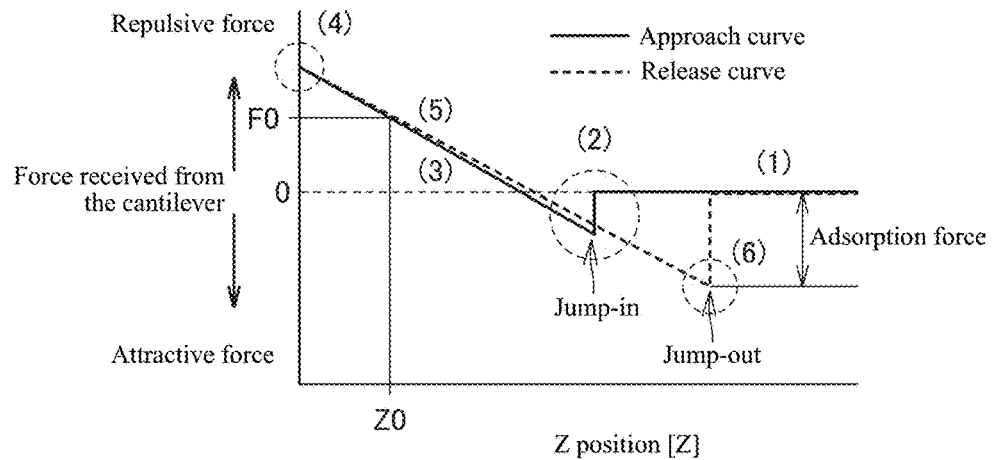
FIG. 3 is a diagram showing an example of a force curve when the cantilever 2 is displaced as shown in FIG. 2.

As shown in (1) to (4), the sample S approaches the probe 20, and as shown in (4) to (6), the sample S is released from the probe 20. FIG. 3 is a diagram showing an example of the force curve when the cantilever 2 is displaced as shown in FIG. 2. In FIG. 3, the horizontal axis represents the vertical position Z of the sample S with the position of the probe 20 as the origin. The position Z in the vertical direction represents the distance between the probe 20 and the sample S in the vertical direction. The vertical axis of FIG. 3 represents the force, i.e., the force that the cantilever 2 receives.

In the state of (1), the probe 20 provided at the tip of the cantilever 2 is completely separated from the sample S. In the state of (2), the cantilever 2 receives a slight attraction force from the sample S and warps downward. This is called "jump-in". In the state of (3), the cantilever 2 receives a repulsive force and warps upward. In the state of (4), the probe 20 and the sample S are closely in contact with each other, and the repulsive force is maximized. In the state of (5), the force that the cantilever 2 receives changes from a repulsive force to an attractive force. In the state of (6), an attractive force acts between the cantilever 2 and the sample S, and the attractive force becomes maximum. Immediately after the state of (6), the probe 20 moves away from the sample S and returns to the state of (1). This is called "jump-out".

The force curve of FIG. 3 consists of an approach curve at the time of approaching and a release curve at the time of releasing. The surface shape image is an image in which the value Z0 at the Z position with respect to the certain force F0 on the approach curve is represented by a pixel value. Further, the adsorption quantity may be measured from the difference between the start point (minimum value) and the end point (maximum value) of the force F at the time of the jump-out.

Figure 4:
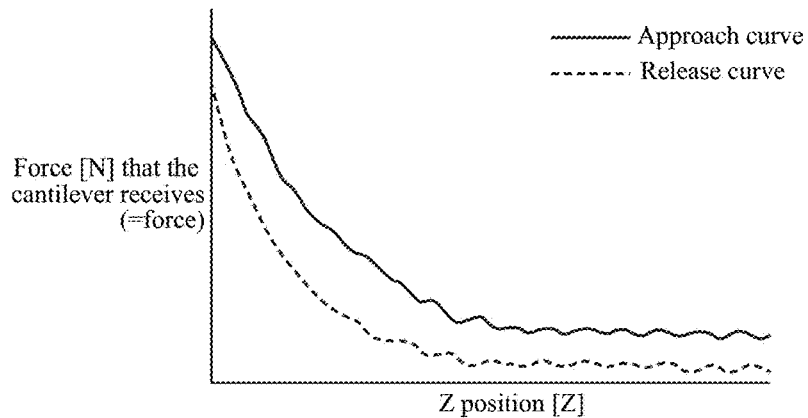
FIG. 4 is a diagram showing another example of a focus curve.

FIG. 4 is a diagram showing another example of the focus curve.

For example, in a case where the sample S is soft, no jump-in and no jump-out occur in the force curve as shown in FIG. 4. In a case where the sample S is soft, no jump-out occurs, so that the adsorption force cannot be measured.

In this embodiment, the physical quantity calculation unit 53 calculates the elastic recovery quantity as the physical quantity of the sample S from the force curve. The quantity representing the area between the approach curve and the release curve is calculated as the elastic recovery quantity of the sample S. The physical quantity calculation unit 53 may calculate the quantity representing the area between the approach curve and the release curve in the range of the distance between the probe 20 and the sample S in which the magnitude of the inclination of the approach curve becomes equal to or more of a threshold TH1.

The approach curve and the release curve are composed of a plurality of sample points. Therefore, the physical quantity calculation unit 53 may calculate the differential value ΔF between the force F1 on the approach curve and the force F2 on the release curve at each sample point of the distance between the probe 20 and the sample S in the range of the distance between the probe 20 and the sample S in which the magnitude of the inclination of the difference value is equal to or greater than the threshold TH1, and determine that the sum of the differential values ΔF as the elastic recovery quantity.

Figure 5:
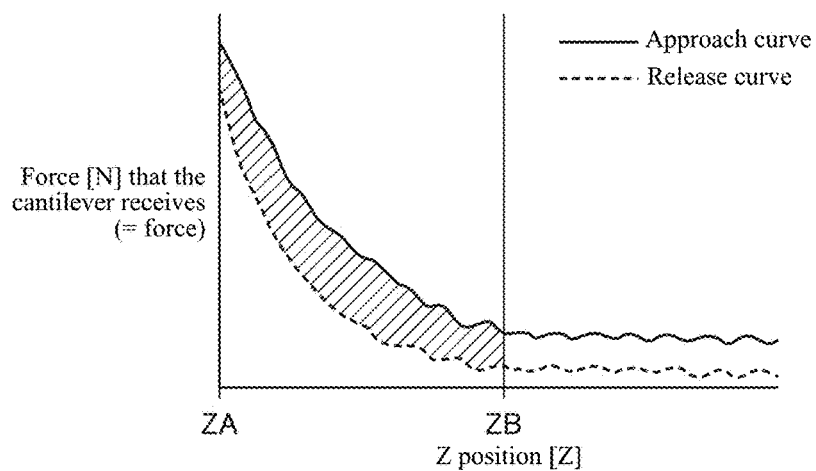
FIG. 5 is a diagram showing a calculation example of an elastic recovery quantity.

FIG. 5 is a diagram showing an exemplary calculation of an elastic recovery quantity.

As shown in FIG. 5, in the range of ZA to ZB, the area between the approach curve and the release curve can be determined as the elastic recovery quantity. The range of ZA to ZB is a range in which the magnitude of the inclination of the approach curve is equal to or more than the threshold TH1.

Figure 6:
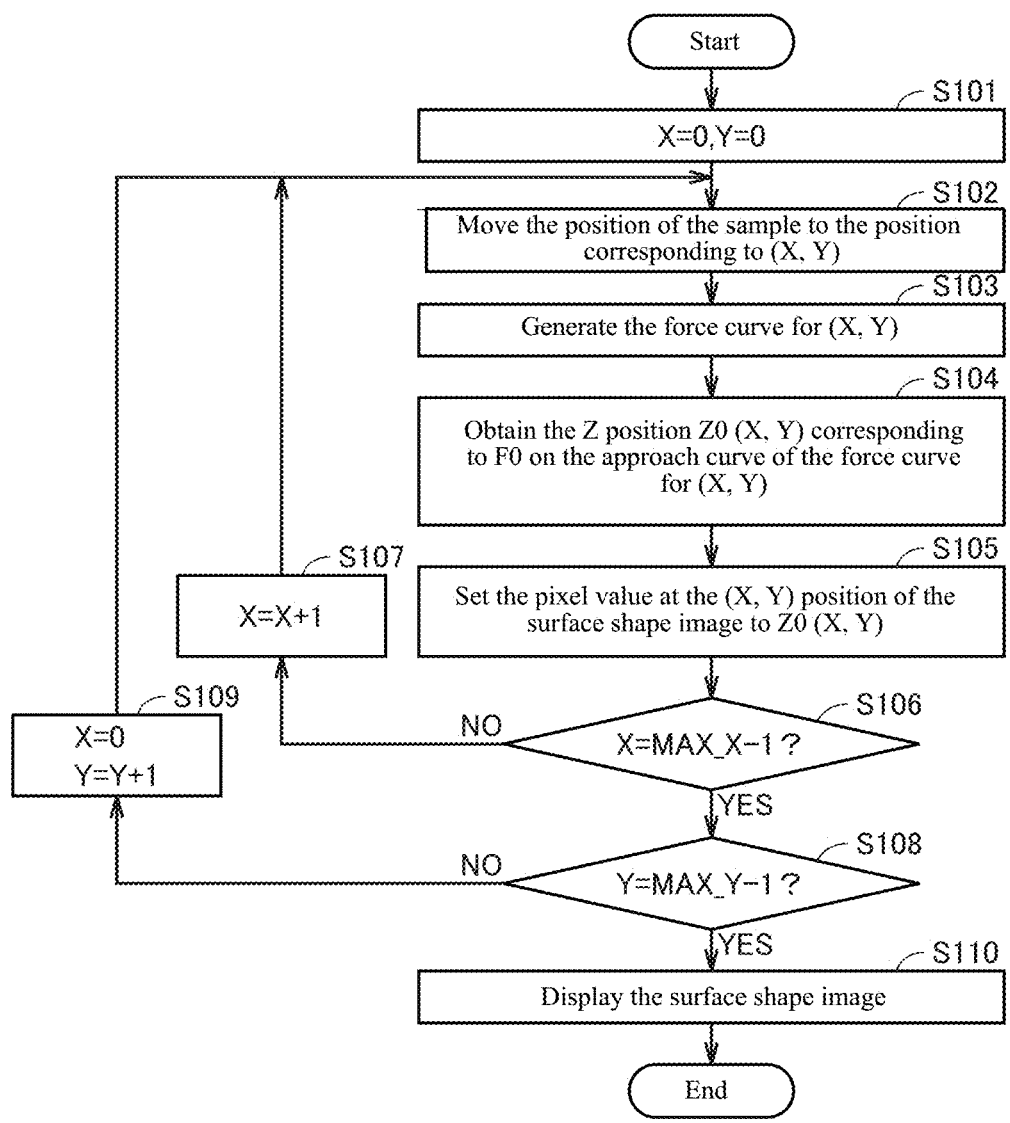
FIG. 6 is a flowchart showing the generation procedure of a surface shape image according to the first embodiment.

FIG. 6 is a flowchart showing the generation procedures of the surface shape image according to the first embodiment. The size of the surface shape image is defined as X_MAX×Y_MAX.

In Step S101, the surface shape image generation unit 12 sets the position (X, Y) of the pixel of the surface shape image to (0, 0).

In Step S102, the drive unit 4 moves the position of the sample S in the horizontal direction to a position corresponding to (X, Y).

In Step S103, the force curve generation unit 11 generates a force curve for (X, Y).

In Step S104, the shape value calculation unit 52 calculates the Z position Z0 (X,Y) for a certain force F0 on the approach curve that constitutes the force curve for (X,Y) as a shape value.

In Step S105, the surface shape image generation unit 12 sets the pixel value of the position (X, Y) of the pixel of the surface shape image as a shape value Z0 (X, Y).

In Step S106, when X=MAX_X−1, the process proceeds to Step S108, and when not X=MAX_X−1, the process proceeds to Step S107.

In Step S107, the surface shape image generation unit 12 increments X.

Thereafter, the process returns to Step S102.

In Step S108, when Y=MAX_Y−1, the process proceeds to Step S110, and when not Y=MAX_Y−1, the process proceeds to Step S109.

In Step S109, the surface shape image generation unit 12 increments Y while setting X=0. Thereafter, the process returns to Step S102.

In Step S110, the surface shape image generation unit 12 displays the surface shape image on the display unit 51.

Figure 7:
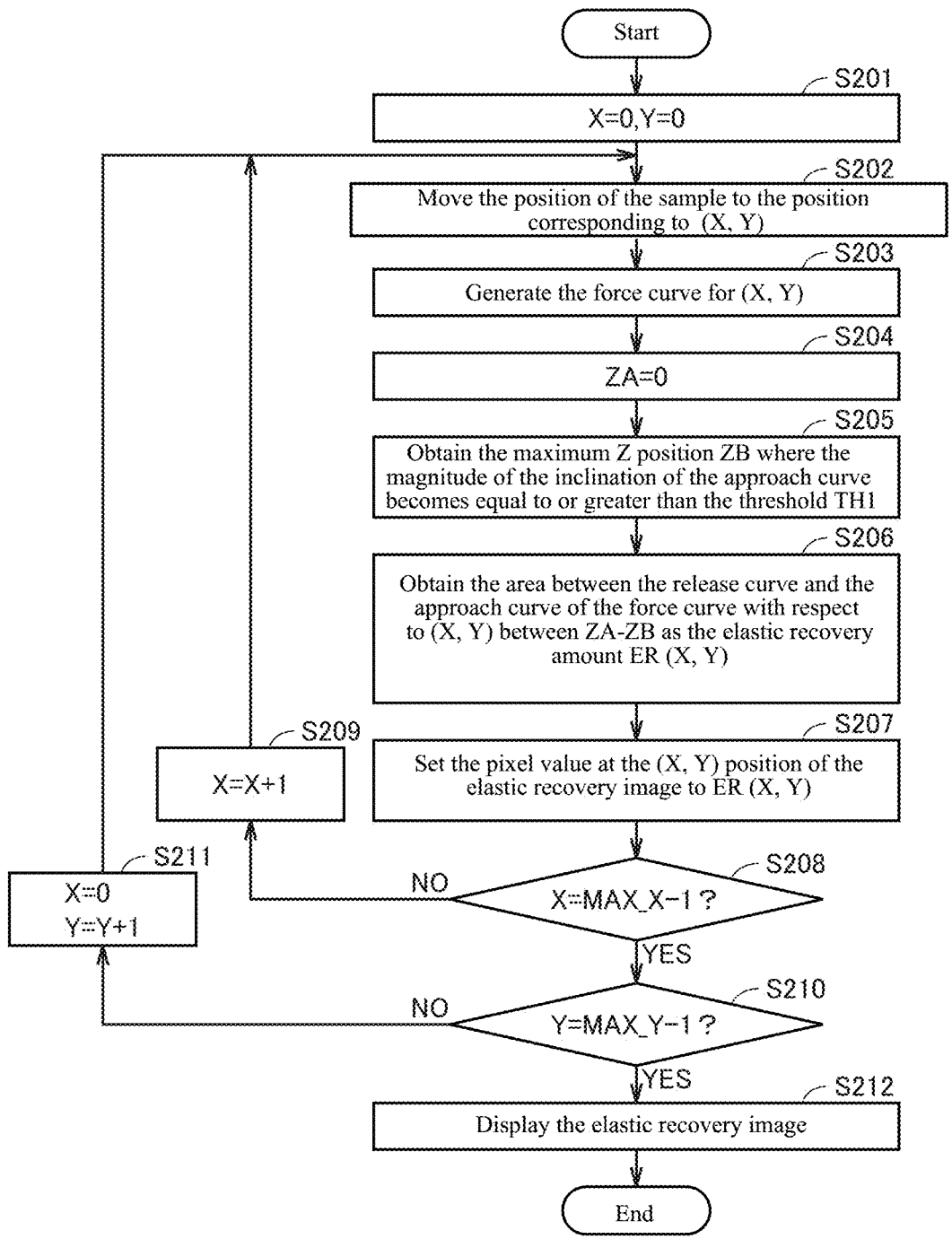
FIG. 7 is a flowchart showing the generation procedure of an elastic recovery image according to the first embodiment.

FIG. 7 is a flowchart showing the generation procedures of the elastic recovery image according to the first embodiment. The size of the elastic recovery image is set to X_MAX×Y_MAX.

In Step S201, the physical quantity image generation unit 13 sets the position (X, Y) of the elastic recovery image pixel to (0, 0).

In Step S202, the drive unit 4 moves the position of the sample S in the horizontal direction to a position corresponding to (X, Y).

In Step S203, the force curve generation unit 11 generates a force curve for (X, Y).

In Step S204, the physical quantity calculation unit 53 sets the minimum value "0" of the Z position of the force curve for (X, Y) to the start point ZA.

In Step S205, the physical quantity calculation unit 53 calculates the maximum value of the Z position where the magnitude of the inclination of the approach curve constituting the force curve for (X, Y) is equal to or greater than the threshold TH1 as the end point ZB. The magnitude of the inclination of the approach curve becomes equal to or greater than the threshold TH1 in the range from the start point ZA to the end point ZB.

In Step S206, the physical quantity calculation unit 53 calculates the area between the approach curve and the release curve in the section where the Z position is between ZA and ZB as the elastic recovery quantity ER (X, Y).

In Step S207, the physical quantity image generation unit 13 sets the pixel value of the position (X, Y) of the elastic recovery image pixel as the elastic recovery quantity ER (X, Y).

In Step S208, when X=MAX_X−1, the process proceeds to Step S210, and when not X=MAX_X−1, the process proceeds to Step S209.

In Step S209, the physical quantity image generation unit 13 increments X. Thereafter, the process returns to Step S202.

In Step S210, when Y=MAX_Y−1, the process proceeds to Step S212, and when not Y=MAX_Y−1, the process proceeds to Step S211.

In Step S211, the physical quantity image generation unit 13 increments Y while setting X=0. Thereafter, the process returns to Step S202.

In Step S212, the physical quantity image generation unit 13 displays the elastic recovery image on the display unit 51.

Figure 8:
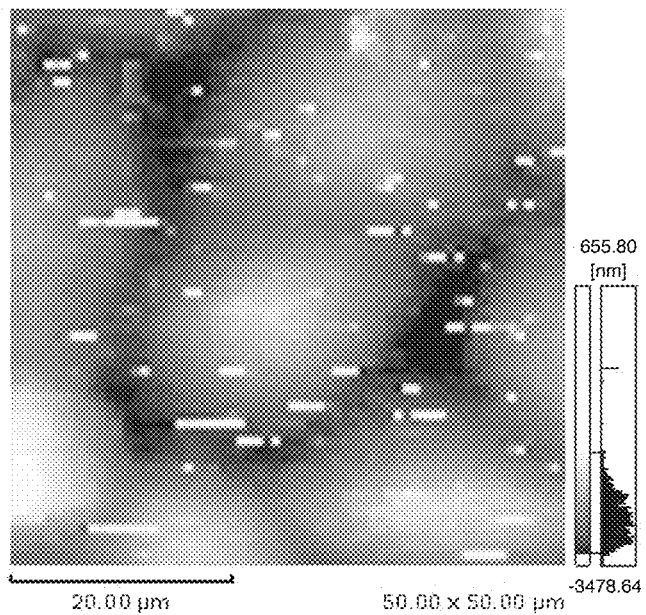
FIG. 8 is a diagram showing an example of a surface shape image when a sample S is a HeLa cell.

FIG. 8 is a diagram showing an example of a surface shape image in a case where the sample S is HeLa cells.

As shown in FIG. 8, the shapes of HeLa cells can be known by the surface shape image.

Figure 9:
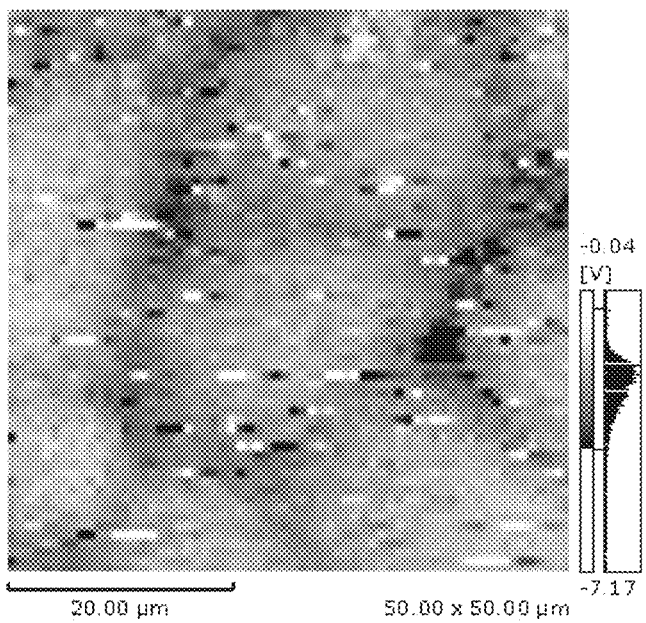
FIG. 9 is a diagram showing an example of an elastic recovery image when a sample S is a HeLa cell.

FIG. 9 is a diagram showing an example of an elastic recovery image in a case where the sample S is HeLa cells.

As shown in FIG. 9, the elastic recovery image allows one to know the elastic recovery quantity of the interior of HeLa cells (i.e., how quickly the indentations of HeLa cells return when the probe 20 is separated from HeLa cells after HeLa cells are depressed by the probe 20).

Comparing the elastic recovery image of a normal cell with that of an abnormal cell can provide insights into the difference in the hardness of cell-cell adhesions, which in turn can be used to analyze events occurring in cells before and after the development of diseases, such as, e.g., cancer and Parkinsonian disorders.

Second Embodiment

In the second embodiment, an elastic recovery quantity is determined in the specified range of the Z position of the force curve.

Figure 10:
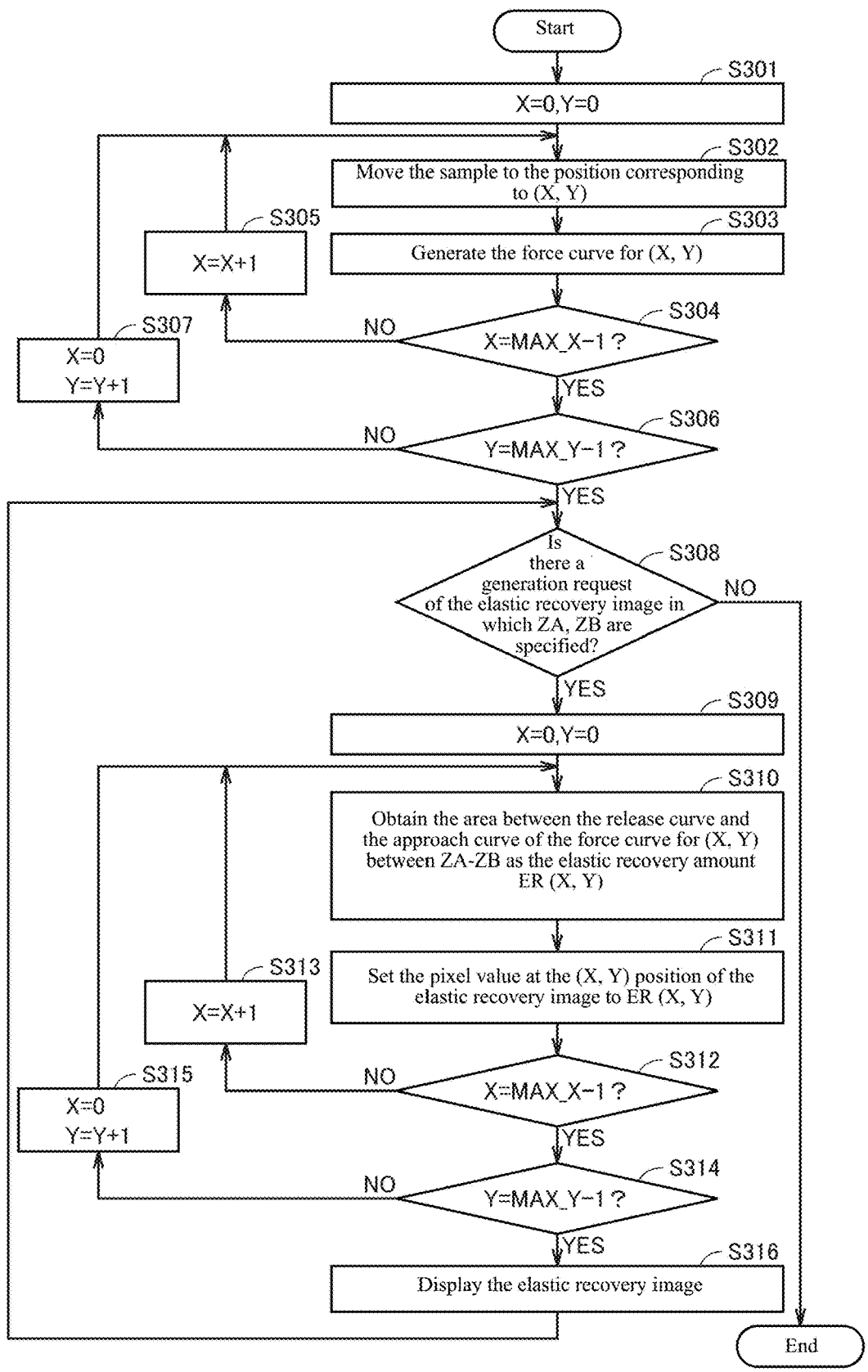
FIG. 10 is a flowchart showing the generation procedure of an elastic recovery image according to a second embodiment.

FIG. 10 is a flowchart showing the generation procedures of the elastic recovery image according to the second embodiment. The size of the elastic recovery image is set to X_MAX×Y_MAX.

In Step S301, the physical quantity image generation unit 13 sets the position (X, Y) of the pixel of the elastic recovery image to (0, 0).

In Step S302, the drive unit 4 moves the position of the sample S in the horizontal direction to a position corresponding to (X, Y).

In Step S303, the force curve generation unit 11 generates a force curve for (X, Y).

In Step S304, when X=MAX_X−1, the process proceeds to Step S306, and when not X=MAX_X−1, the process proceeds to Step S305.

In Step S305, the physical quantity image generation unit 13 increments X. Thereafter, the process returns to Step S302.

In Step S306, when Y=MAX_Y−1, the process proceeds to Step S308, and when not Y=MAX_Y−1, the process proceeds to Step S307.

In Step S307, the physical quantity image generation unit 13 increments Y while setting X=0. Thereafter, the process returns to Step S302.

In Step S308, when there is a generation request of the elastic recovery image specifying the range of the Z position of the force curve (the start point ZA and the end point ZB), the process proceeds to Step S309. When there is no generation request of the elastic recovery, the process ends.

In Step S309, the physical quantity image generation unit 13 sets the position (X, Y) of the pixel of the elastic recovery image to (0, 0).

In Step S310, the physical quantity calculation unit 53 calculates the area between the approach curve and the release curve in the section where the Z position of the force curve for (X, Y) is between ZA and ZB as an elastic recovery quantity ER (X, Y).

In Step S311, the physical quantity image generation unit 13 sets the pixel value of the position (X, Y) of the elastic recovery image pixel as the elastic recovery quantity ER (X, Y).

In Step S312, when X=MAX_X−1, the process proceeds to Step S314, and when not X=MAX_X−1, the process proceeds to Step S313.

In Step S313, the physical quantity image generation unit 13 increments X. Thereafter, the process returns to Step S310.

In Step S314, when Y=MAX_Y−1, the process proceeds to Step S316, and when not Y=MAX_Y−1, the process proceeds to Step S315.

In Step S315, the physical quantity image generation unit 13 increments Y while setting X=0. Thereafter, the process returns to Step S310.

In Step S316, the physical quantity image generation unit 13 displays the elastic recovery image on the display unit 51. Thereafter, the process returns to Step S308.

Figure 11:
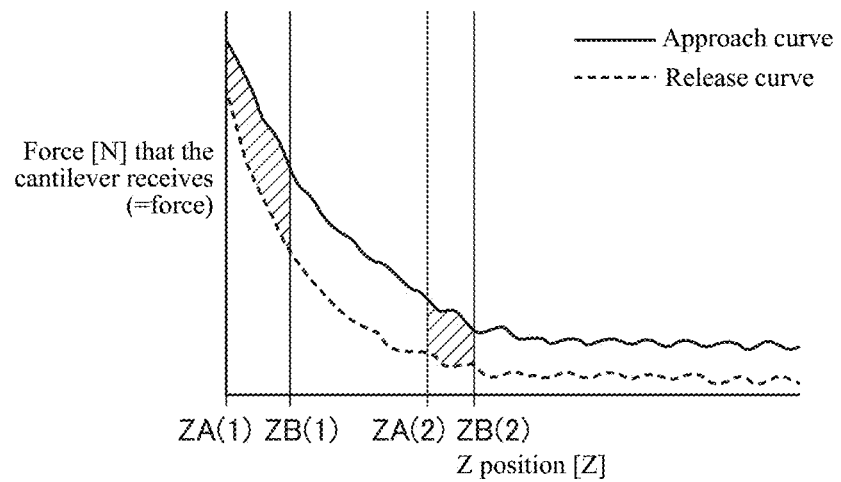
FIG. 11 is a diagram showing an example of specifying the range of a Z position of a force curve.

FIG. 11 is a diagram showing an example of specifying a range of Z positions of the force curve.

The first range is the range with the start point as ZA (1) and the end point as ZB (1). The second range is the range with the start point as ZA(2) and the end point as ZB(2).

In Step S308, when a plurality of requests of generating elastic recovery images different in the specification of the range (start point ZA and end point ZB) of the Z position of the force curve, the physical quantity calculation unit 53 calculates an elastic recovery quantity (X, Y) for each of the plurality of specified ranges. The physical quantity image generation unit 13 generates a plurality of elastic recovery images different in the specified range. As shown in FIG. 11, in a case where the first range and the second range are specified, two elastic recovery images different in the specified range are obtained.

Third Embodiment

In a third embodiment, a shape value at the specified force of a force curve is obtained.

Figure 12:
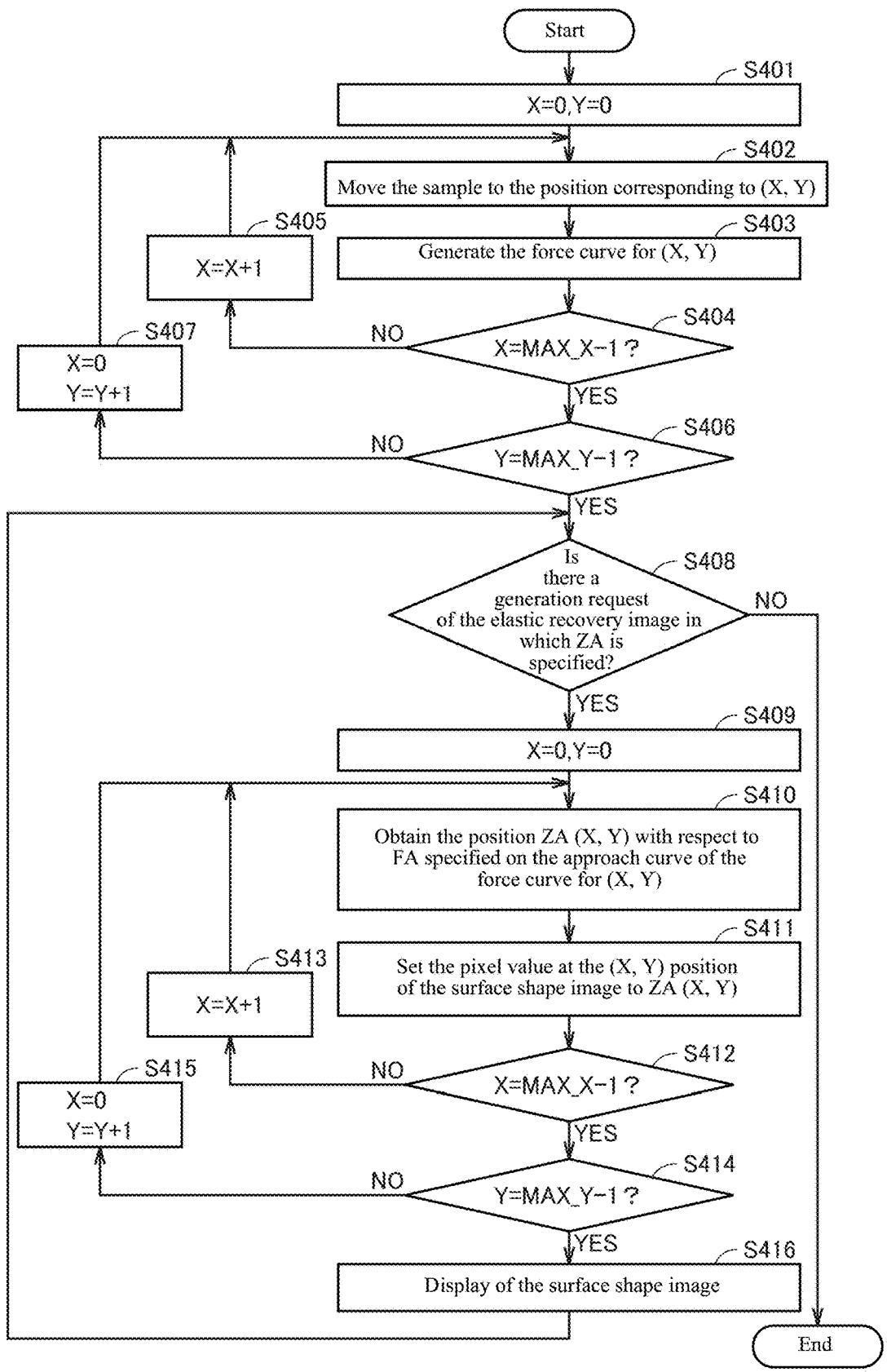
FIG. 12 is a flowchart showing the generation procedure of a surface shape image according to a third embodiment.

FIG. 12 is a flowchart showing the generation procedures of a surface shape image according to the third embodiment. The size of the surface shape image is set to X_MAX× Y_MAX.

In Step S401, the surface shape image generation unit 12 sets the position (X, Y) of the pixel of the surface shape image to (0, 0).

In Step S402, the drive unit 4 moves the position of the sample S in the horizontal direction to a position corresponding to (X, Y).

In Step S403, the force curve generation unit 11 generates a force curve for (X, Y).

In Step S404, when X=MAX_X−1, the process proceeds to Step S406, and when not X=MAX_X−1, the process proceeds to Step S405.

In Step S405, the surface shape image generation unit 12 increments X. Thereafter, the process returns to Step S402.

In Step S406, when Y=MAX_Y−1, the process proceeds to Step S408, and when not Y=MAX_Y−1, the process proceeds to Step S407.

In Step S407, the surface shape image generation unit 12 increments Y while setting X=0. Thereafter, the process returns to Step S402.

In Step S408, in a case where there is a generation request of a surface shape image in which the force FA of the force curve is specified, the process proceeds to Step S409. In a case where there is no request of generating a surface shape image, the process ends.

In Step S409, the surface shape image generation unit 12 sets the position (X, Y) of the surface shape image pixel to (0, 0).

In Step S410, the shape value calculation unit 52 calculates the Z position ZA (X,Y) with respect to the force FA on the approach curve on the force curve for (X, Y) as a shape value.

In Step S411, the surface shape image generation unit 12 sets the pixel value of the position (X, Y) of the surface shape image pixel to a shape value ZA (X, Y).

In Step S412, when X=MAX_X−1, the process proceeds to Step S414, and when not X=MAX_X−1, the process proceeds to Step S413.

In Step S413, the surface shape image generation unit 12 increments X. Thereafter, the process returns to Step S410.

In Step S414, when Y=MAX_Y−1, the process proceeds to Step S416, and when not Y=MAX_Y−1, the process proceeds to Step S415.

In Step S415, the surface shape image generation unit 12 increments Y while setting X=0. Thereafter, the process returns to Step S410.

In Step S416, the surface shape image generation unit 12 displays the surface shape image on the display unit 51. Thereafter, the process returns to Step S408.

Figure 13:
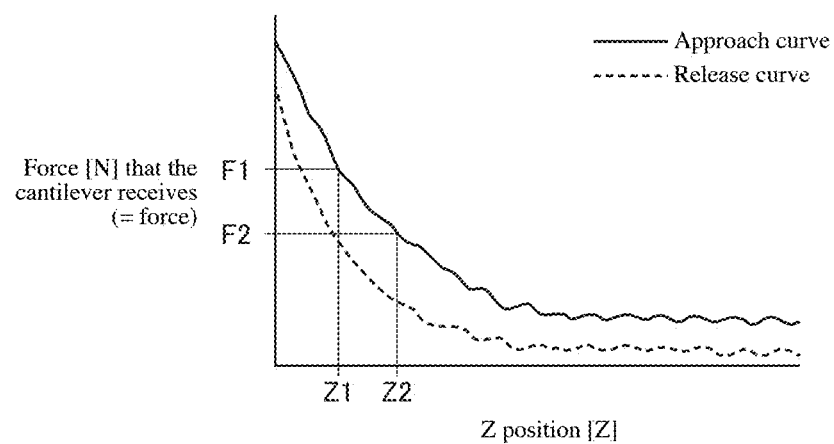
FIG. 13 is a diagram showing an example of specifying a force FA of a force curve.

FIG. 13 is a diagram showing an example of specifying a force FA of a force curve.

In FIG. 13, a first force FA1 and a second force FA2 are specified.

In Step S408, in a case where there is a generation request of a plurality of surface shape images different in the specification of the force FA of the force curve, the shape value calculation unit 52 calculates a shape value ZA (X, Y) for each of the plurality of specified forces. The surface shape image generation unit 12 generates a plurality of surface shape images different in the specified force. As shown in FIG. 13, when the first force and the second force are specified, two surface shape images different in the force are obtained.

Figure 14:
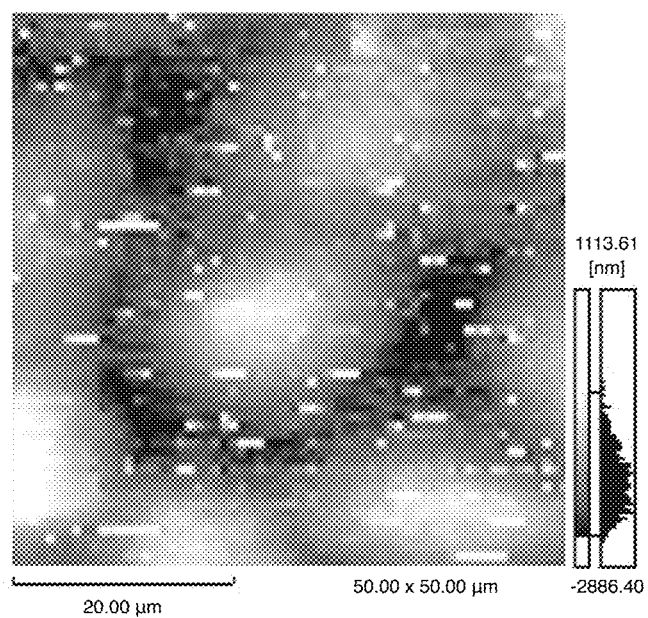
FIG. 14 is a diagram showing an example of a surface shape image for a first force FA1 when a sample S is a HeLa cell.
Figure 15:
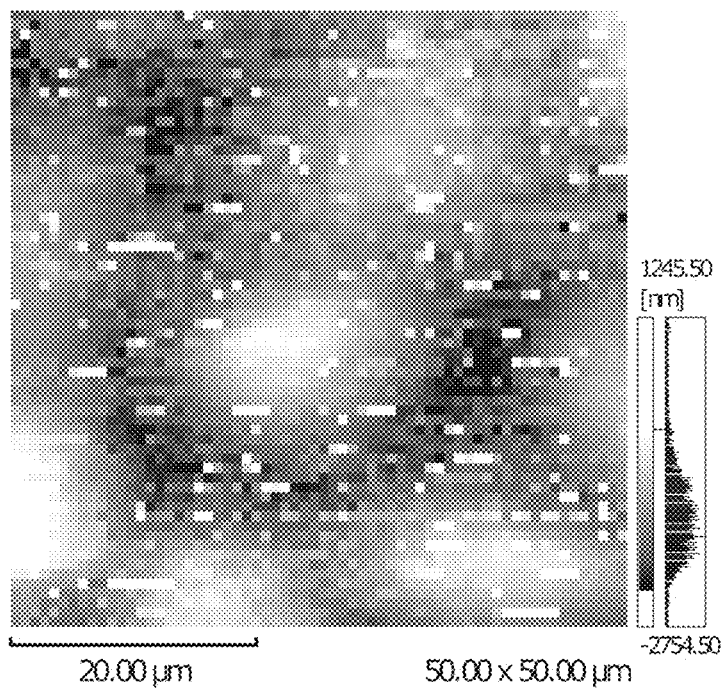
FIG. 15 is a diagram showing an example of a surface shape image for a second force FA2 when a sample S is a HeLa cell.

FIG. 14 is a diagram showing an example of a surface shape image for a first force FA1 when the sample S is HeLa cells. FIG. 15 is a diagram showing an example of a surface shape image for a second force FA2 when the sample S is HeLa cells.

The difference in the force, i.e., the difference in the force pushing HeLa cells, results in different surface shape images. The force FA, which is the pushing force, may be gradually changed to generate a plurality of surface shape images, and the plurality of surface shape images may be displayed successively like a moving image, thereby showing a state in which the cells are deformed.

Fourth Embodiment

Figure 16:
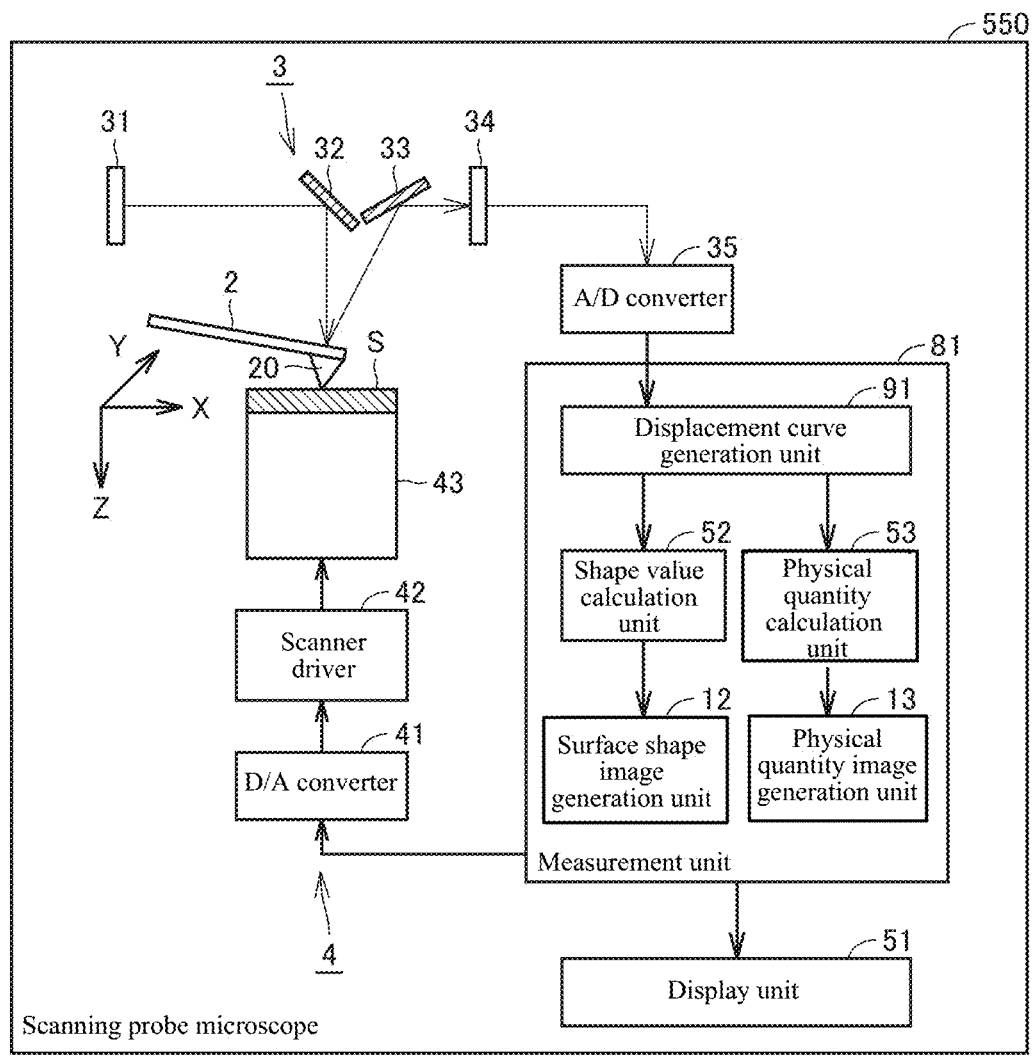
FIG. 16 is a diagram showing a configuration of a scanning probe microscope 550 according to a fourth embodiment.

FIG. 16 is a diagram showing a configuration of a scanning probe microscope 550 according to a fourth embodiment.

The scanning probe microscope 550 of the fourth embodiment is provided with a displacement curve generation unit 91 instead of the force curve generation unit 11.

In the first embodiment, the force curve generation unit 11 generates a force curve by multiplying the displacement D [V] of the cantilever 2 by the spring constant K [N/m] and the sensitivity S [m/V] to calculate the force.

In this embodiment, the displacement curve generation unit 91 generates a displacement curve representing the time change of the displacement of the cantilever 2.

Figure 17:
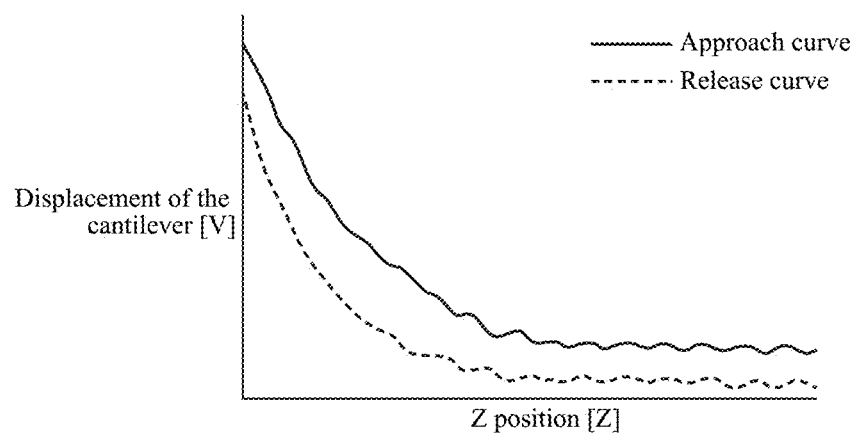
FIG. 17 is a diagram showing an example of a displacement curve.

FIG. 17 is a diagram showing an example of a displacement curve.

In FIG. 17, the horizontal axis represents the vertical position Z of the sample S with the probe 20 as the origin. The vertical position Z represents the distance in the vertical direction between the probe 20 and the sample S. The vertical axis in FIG. 17 represents the displacement of the cantilever 2.

Since the spring constant K [N/m] and the sensitivity S [m/V] are constants, the displacement curve of this embodiment has the same shape as the force curve. Therefore, the shape value and the elastic recovery quantity described in the first to third embodiments can also be obtained by the displacement curve.

Therefore, in this embodiment, the shape value calculation unit 52 calculates the shape value using a displacement curve in the same manner as in the case in which a shape value is calculated using a force curve. Similarly, the physical quantity calculation unit 53 uses a displacement curve to calculate the elastic recovery quantity in the same manner as in a case where a force curve is used to calculate the elastic recovery quantity.

(Modifications)

The present invention is not limited to the above-described embodiments, and includes, for example, the following modifications.

(1) Shape Value

In the above-described embodiments, the Z position with respect to a certain force F on the approach curve is a shape value, but the present invention is not limited thereto. For example, the Z position for a certain force F on a release curve may be a shape value. Alternatively, the Z position for a certain force F on an approach curve and the Z position for a certain force F on a release curve may be a shape value.

(2) Calculation of Area

In the first embodiment, the physical quantity calculation unit 53 calculates the maximum value of the Z position where the magnitude of the inclination of the approach curve constituting the force curve is equal to or greater than the threshold TH1 as the end point ZB for the area calculation, but is not limited thereto. The physical quantity calculation unit 53 may calculate the maximum value of the Z position where the magnitude of the inclination of the release curve constituting the force curve becomes equal to or greater than the threshold TH2 as the end point ZB for the area calculation. Alternatively, the physical quantity calculation unit 53 may calculate, as the end point ZB for the area calculation, the maximum value of the Z position where the magnitude of the inclination of the approach curve constituting the force curve is equal to or greater than the threshold TH1 and the magnitude of the inclination of the release curve constituting the force curve is equal to or greater than the threshold TH2. In the above, the threshold TH1 and the threshold TH2 may be the same.

(3) Drive Unit

In the above-described embodiments, the drive unit moves the sample S three-dimensionally, but not limited thereto. The drive unit may move the probe 20 three-dimensionally.

The embodiments disclosed herein are to be considered in all respects as illustrative and not restrictive. The scope of the present invention is indicated by the appended claims rather than by the foregoing descriptions, and is intended to include all modifications within the meanings and ranges equivalent to the scope of the claims.

(4) Measurement Unit 1

Figure 18:
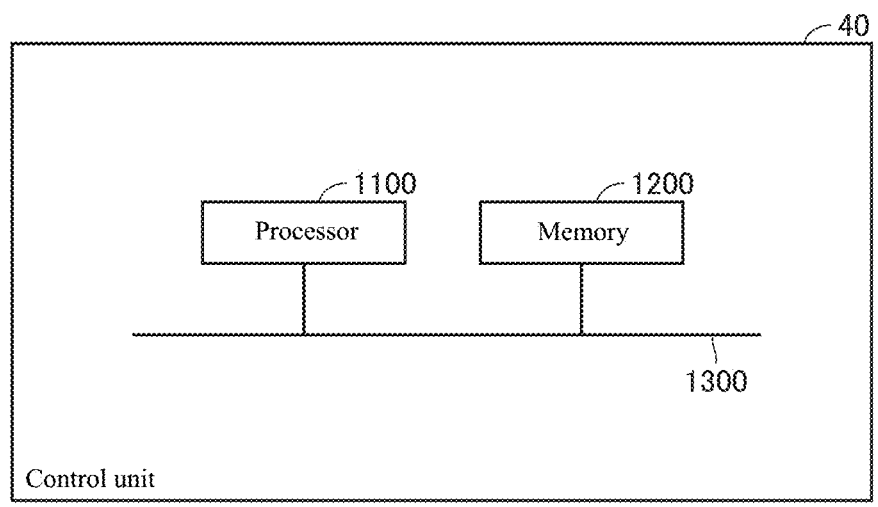
FIG. 18 is a diagram showing an example of a hardware configuration of a measurement unit.

FIG. 18 is a diagram showing an example of a hardware configuration of the measurement unit.

The hardware of the force curve generation unit 11, the shape value calculation unit 52, the surface shape image generation unit 12, the physical quantity calculation unit 53, and the physical quantity image generation unit 13 constituting the measurement unit 1 of FIG. 1 is provided with a processor 1100 and a memory 1200 connected to the processor 1110 via a bus 1300. The control unit 40 is implemented by a processor 1110-1100, such as, e.g., a CPU (Central Processing Unit), executing a program stored in the memory 1200. In addition, a plurality of processors and a plurality of memories may be combined to perform the functions of the above-described components. The same applies to the displacement curve generation unit 91, the shape value calculation unit 52, the surface shape image generation unit 12, the physical quantity calculation unit 53, and the physical quantity image generation unit 13, constituting the measurement unit 81 of FIG. 9.

The embodiments disclosed herein are to be considered in all respects as illustrative and not restrictive. The scope of the present invention is indicated by the appended claims rather than by the foregoing descriptions, and is intended to include all modifications within the meanings and ranges equivalent to the scope of the claims.

DESCRIPTION OF SYMBOLS 1, 81: Measurement unit
2: Cantilever
3: Displacement measurement unit
4: Drive unit
11: Force curve generation unit
12: Surface shape image generation unit
13: Physical quantity image generation unit
20: Probe
31: Light source
32, 33: Mirror
34: Photodetector
35: A/D converter
41: D/A converter
42: Scanner driver
43: Scanner
50, 550: Scanning probe microscope
52: Shape value calculation unit
53: Physical quantity calculation unit
91: Displacement curve generation unit
S: Sample

The invention claimed is:

1. A scanning probe microscope comprising:
a probe;
a support member supporting the probe;
a placement unit configured to place a sample thereon;
a drive unit configured to change a distance between the sample and an origin of the probe;
a displacement measurement unit configured to measure a displacement of the support member;
a curve generation unit configured to generate a first curve representing a relation between the distance between the origin of the probe and the sample and a quantity representing the displacement of the support member throughout a measurement range comprising a range of distances between the origin of the probe and the sample when the sample approaches origin of the probe and a second curve representing a relation between the distance between the origin of the probe and the sample and a quantity representing the displacement of the support member throughout the measurement range when the sample moves away from the origin of the probe; and
a physical quantity calculation unit configured to calculate, as a physical quantity of the sample, a quantity representing an area between the first curve and the second curve in at least one of:
a first range of the distance between the origin of the probe and the sample in which the magnitude of an inclination of the first curve is equal to or greater than a first threshold, and
a second range of the distance between the origin of the probe and the sample in which the magnitude of an inclination of the second curve is equal to or greater than a second threshold,
wherein each of the first range and the second range is a subset of the measurement range.

2. The scanning probe microscope as recited in claim 1, wherein the physical quantity of the sample is a quantity representing hardness of the sample.

3. The scanning probe microscope as recited in claim 2, wherein the curve generation unit uses a force that the support member receives due to the displacement as a quantity representing the displacement of the support member.

4. The scanning probe microscope as recited in claim 2, wherein the drive unit scans the sample or the probe in a horizontal direction,
wherein the displacement measurement unit measures the displacement of the support member at each position in the horizontal direction,
wherein the curve generation unit is configured to generate the first curve and the second curve at each position in the horizontal direction,
wherein the physical quantity calculation unit is configured to calculate the physical quantity at each position in the horizontal direction, and
wherein the scanning probe microscope further comprises an image generation unit configured to generate an image in which the physical quantity with respect to each position in the horizontal direction is represented by a pixel value.

5. The scanning probe microscope as recited in claim 1, wherein the physical quantity calculation unit is configured to calculate, as the physical quantity of the sample, the quantity representing the area between the first curve and the second curve in the range of the distance between the origin of the probe and the sample in which the magnitude of the inclination of the first curve is equal to or greater than the first threshold.

6. The scanning probe microscope as recited in claim 1, wherein the physical quantity calculation unit is configured to calculate, as the physical quantity of the sample, the quantity representing the area between the first curve and the second curve in the range of the distance between the origin of the probe and the sample in which the magnitude of the inclination of the second curve is equal to or greater than the second threshold.

7. The scanning probe microscope as recited in claim 1, wherein the physical quantity calculation unit is configured to calculate, as the physical quantity of the sample, the quantity representing the area between the first curve and the second curve in the range of the distance between the origin of the probe and the sample in which the magnitude of the inclination of the first curve is equal to or greater than the first threshold and the magnitude of the inclination of the second curve is equal to or greater than the second threshold.

8. The scanning probe microscope as recited in claim 1, wherein the physical quantity calculation unit is configured to calculate, as the physical quantity of the sample, the quantity representing the area between the first curve and the second curve in a first specified range of distances between the origin of the probe and the sample, the first specified range being a subset of the measurement range.

9. The scanning probe microscope as recited in claim 8, wherein the physical quantity calculation unit is configured to calculate the physical quantity for each of a plurality of the specified ranges of distances between the origin of the probe and the sample, each of the specified ranges being a subset of the measurement range, the plurality of specified ranges including the first specified range, and
wherein the image generation unit is configured to generate a plurality of images, each image corresponding to a different specified range of the plurality of specified ranges.

10. The scanning probe microscope as recited in claim 1, wherein the displacement measurement unit measures the displacement at a plurality of points of the distance between the origin of the probe and the sample, and
wherein the physical quantity calculation unit is configured to calculate a difference value between a quantity representing a displacement on the first curve and a quantity representing a displacement on the second curve at each of the plurality of points and is configured to calculate a sum of the difference values as the physical quantity of the sample.

11. The scanning probe microscope as recited in claim 1, wherein the support member is a cantilever.

12. A method of measuring a physical quantity using a scanning probe microscope comprising a probe, a support member supporting the probe, and a placement unit configured to place a sample thereon, a drive unit, and a displacement measurement unit, the method comprising:
changing a distance between the sample and an origin of the probe by the drive unit;
measuring a displacement of the support member by the displacement measurement unit;
generating a first curve representing a relation between the distance between the origin of the probe and the sample and a quantity representing a displacement of the support member throughout a measurement range comprising a range of distances between the origin of the probe and the sample when the sample approaches origin of the probe and a second curve representing a relation between the distance between the origin of the probe and the sample and a quantity representing the displacement of the support member throughout the measurement range when the sample moves away from origin of the probe; and calculating a quantity representing a quantity representing an area between the first curve and the second curve as a physical quantity of the sample in at least one of:
- a first range of the distance between the origin of the probe and the sample in which the magnitude of an inclination of the first curve is equal to or greater than a first threshold, and
- a second range of the distance between the origin of the probe and the sample in which the magnitude of an inclination of the second curve is equal to or greater than a second threshold, wherein each of the first range and the second range is a subset of the measurement range.

13. The method as recited in claim 12,
wherein the physical quantity of the sample is calculated as the quantity representing the area between the first curve and the second curve in the range of the distance between the origin of the probe and the sample in which the magnitude of the inclination of the first curve is equal to or greater than the first threshold.

14. The method as recited in claim 12,
wherein the physical quantity of the sample is calculated as the quantity representing the area between the first curve and the second curve in the range of the distance between the origin of the probe and the sample in which the magnitude of the inclination of the second curve is equal to or greater than the second threshold.

15. The method as recited in claim 12,
wherein the physical quantity of the sample is calculated as the quantity representing the area between the first curve and the second curve in the range of the distance between the origin of the probe and the sample in which the magnitude of the inclination of the first curve is equal to or greater than the first threshold and the magnitude of the inclination of the second curve is equal to or greater than the second threshold.

16. The method as recited in claim 12, further comprising calculating a physical quantity of the sample as the quantity representing the area between the first curve and the second curve in a first specified range of distances between the origin of the probe and the sample, the first specified range being a subset of the measurement range.

* * * * *